(12) United States Patent
Tuck

(10) Patent No.: US 10,182,564 B2
(45) Date of Patent: Jan. 22, 2019

(54) FISHING ROD HOLDER

(71) Applicant: Jeff Tuck, Cochran, GA (US)

(72) Inventor: Jeff Tuck, Cochran, GA (US)

( * ) Notice: Subject to any disclaimer, the term of this patent is extended or adjusted under 35 U.S.C. 154(b) by 511 days.

(21) Appl. No.: 14/991,074

(22) Filed: Jan. 8, 2016

(65) Prior Publication Data
US 2017/0196212 A1    Jul. 13, 2017

(51) Int. Cl.
*A01K 97/10*    (2006.01)

(52) U.S. Cl.
CPC .................................. *A01K 97/10* (2013.01)

(58) Field of Classification Search
CPC ........ A01K 97/10; F16M 13/00; F16M 11/00; B25B 1/00; B25B 1/20; B25B 1/2468; B25B 5/00
USPC ................................................. 47/48.5, 21.1
See application file for complete search history.

(56) References Cited

U.S. PATENT DOCUMENTS

| | | | | |
|---|---|---|---|---|
| 4,673,154 A * | 6/1987 | Karapita | ............. | A61M 5/1415 248/320 |
| 4,836,486 A * | 6/1989 | Vossoughi | ......... | F16M 11/2014 248/280.11 |
| 5,054,737 A * | 10/1991 | DeLancey | ............... | A01K 97/10 248/515 |
| 5,210,971 A * | 5/1993 | Efantis | .................... | A01K 97/10 248/514 |
| 5,438,789 A * | 8/1995 | Emory | ................... | A01K 97/10 248/514 |
| 5,761,844 A * | 6/1998 | Horschel | ................ | A01K 97/10 248/131 |
| 5,918,867 A * | 7/1999 | Goodyear | ............ | B23Q 1/5412 269/71 |
| 7,730,563 B1 * | 6/2010 | Sklar | ...................... | A61B 90/14 5/622 |
| 8,251,455 B1 * | 8/2012 | Midkiff | .................. | A01K 97/22 296/64 |
| 8,756,854 B1 * | 6/2014 | Michaels | ............... | A01K 97/10 43/17 |
| 9,103,150 B1 * | 8/2015 | Wong | .................... | F16M 11/041 |
| 2007/0044367 A1 * | 3/2007 | Slatter | .................... | A01K 97/10 43/21.2 |
| 2008/0138152 A1 * | 6/2008 | Carnevali | .............. | F16M 11/28 403/376 |
| 2009/0084019 A1 * | 4/2009 | Carnevali | .............. | A01K 97/10 43/21.2 |
| 2011/0083355 A1 * | 4/2011 | Wilcox | .................. | A01K 91/08 43/27.4 |
| 2012/0193488 A1 * | 8/2012 | Chung | ................... | F16M 11/10 248/201 |
| 2015/0000177 A1 * | 1/2015 | Liney | ..................... | A01K 97/10 43/21.2 |
| 2015/0223440 A1 * | 8/2015 | Schmaus | ................ | A01K 97/10 43/4.5 |
| 2015/0369418 A1 * | 12/2015 | Wong | .................... | F16M 11/041 248/372.1 |
| 2016/0037762 A1 * | 2/2016 | Thomas | ................. | A01K 97/10 248/636 |

* cited by examiner

*Primary Examiner* — Joshua J Michener
*Assistant Examiner* — George Andonyan
(74) *Attorney, Agent, or Firm* — McClure, Qualey & Rodack, LLP

(57) ABSTRACT

Fishing rod holders with an upper orthogonal coupling and a lower orthogonal coupling, which allow for adjustment of angle and height without using tools (e.g., screwdriver, wrench, etc.).

8 Claims, 4 Drawing Sheets

FISHING ROD HOLDER

BACKGROUND

Field of the Disclosure

The present disclosure relates generally to equipment and, more particularly, to fishing equipment.

Description of Related Art

A variety of different types of fishing rod holders exist. However, there remains much room for improvement. Some conventional fishing rod holders allow for angle adjustment but not height adjustment. Other conventional fishing rod holders allow for height adjustment but not angle adjustment. Yet other conventional fishing rod holders allow for both height and angle adjustment, but these fishing rod holders inconveniently require tools to adjust the height or the angle.

SUMMARY

The present disclosure provides fishing rod holders. For some embodiments, the fishing rod holder comprises an upper orthogonal coupling and a lower orthogonal coupling. The orthogonal couplings allow for adjustment of angle and height without the need for additional tools (e.g., screwdriver, wrench, etc.).

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
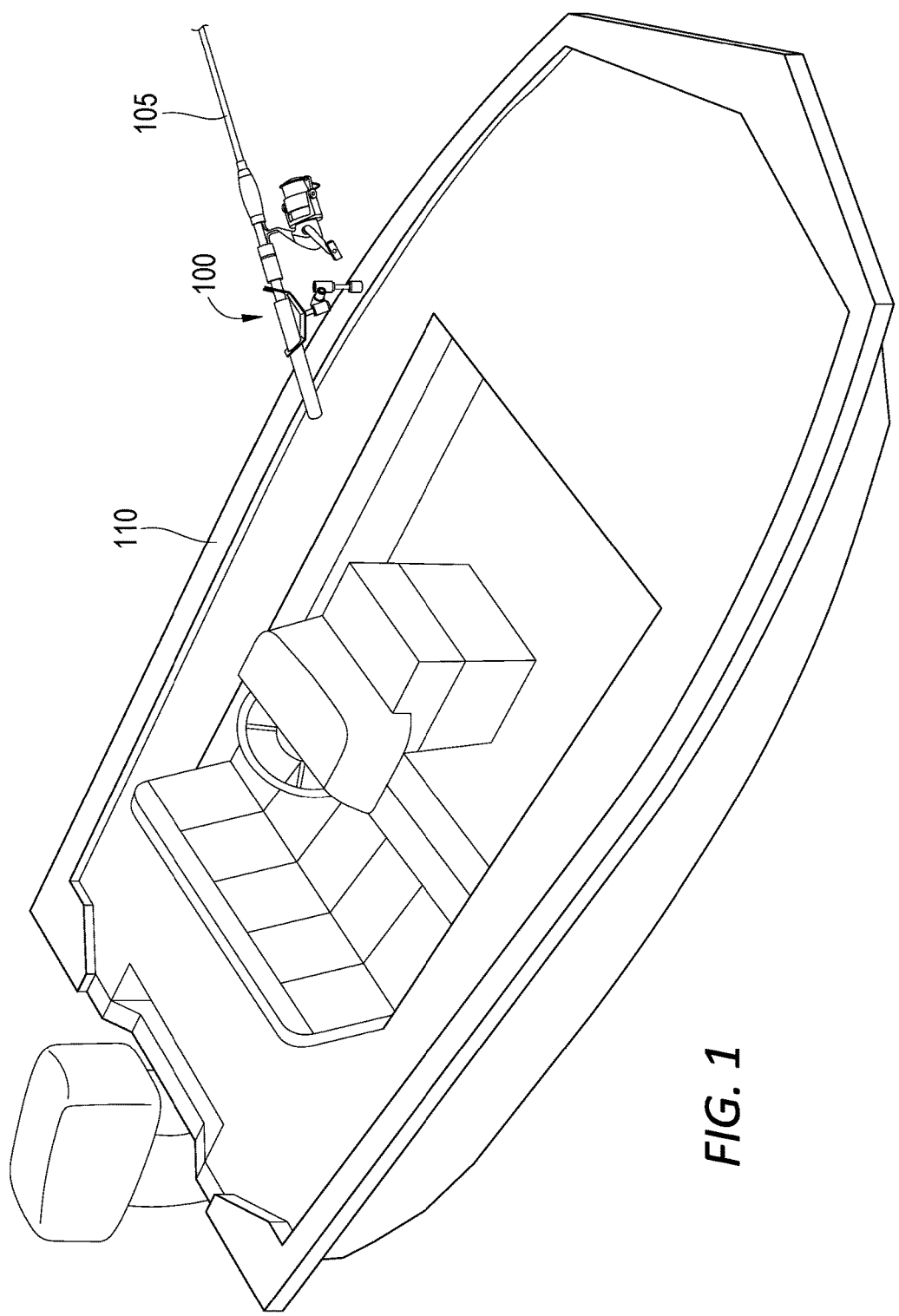
FIG. 1 is a drawing showing one embodiment of a fishing rod holder mounted to a boat.

To address many of the drawbacks in conventional fishing rod holders, the various embodiments of the disclosed fishing rod holder include an upper orthogonal coupling and a lower orthogonal coupling that allow for both angle and height adjustment without the use of any additional tools (e.g., screwdriver, wrench, etc.). Each orthogonal coupling has teeth that engage with a spring-biased shaft with a gear. The spring allows for easy adjustment without the use of tools, while the gear-teeth combination permits fixing of a fishing rod at a desired angle.

With this overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a drawing showing one embodiment of a fishing rod holder 100, which holds a fishing rod 105 and is mounted to a boat 110. It is important to note that the fishing rod holder 100 can also be mounted to a pier, or to virtually any structure. For example, the holder can be mounted in or on a vehicle, such as the bed of a truck, for use in transporting fishing rods from place to place or for use in such activities as surf fishing.

Figure 2:
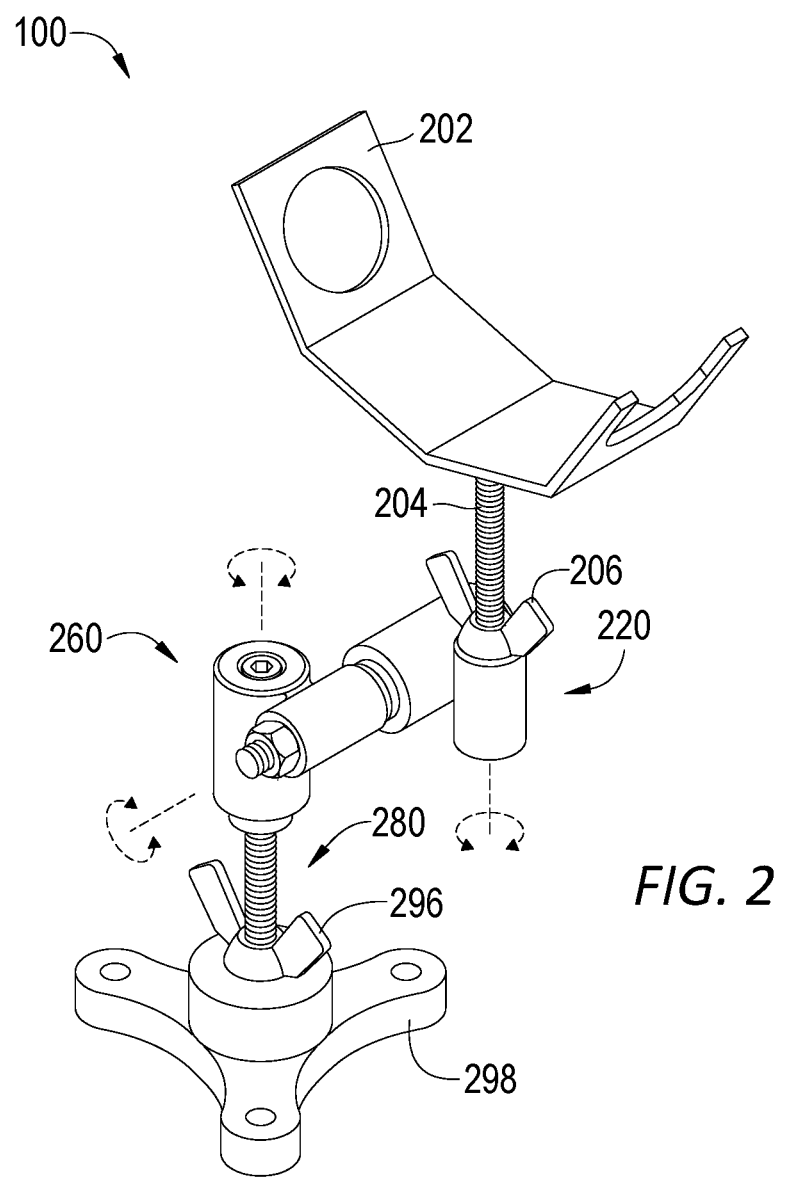
FIG. 2 is a drawing showing the embodiment of the fishing rod holder of FIG. 1 in greater detail.

FIG. 2 is a drawing showing the embodiment of the fishing rod holder 100 of FIG. 1 in greater detail. As shown in FIG. 2, the fishing rod holder 100 comprises a bracket 202 for holding a fishing rod. Extending down from the bracket 202 is a threaded mounting rod 204. The fishing rod holder 100 further comprises an upper orthogonal coupling 220 that engages with the threaded mounting rod 204 to permit rotation of the bracket 202 with reference to the upper orthogonal coupling 220. It should be appreciated that the upper orthogonal coupling 220 need not comprise strictly orthogonal components but, instead, may have components that are affixed at less than orthogonal angles. The fishing rod holder 100 further comprises a wing nut 206 (or any other type of nut) that engages the threaded mounting rod 204. Thus, by adjusting the wing nut 206, one is able to adjust the height of the bracket 202. In this manner, both the height and the rotational angle of the bracket 202 can be adjusted with reference to the boat, thereby permitting sweep adjustment of the fishing rod.

The upper orthogonal coupling 220 is rotationally coupled to a lower orthogonal coupling 260 by an upper adjustment shaft (not shown in FIG. 2). Similar to the upper orthogonal coupling 220, the lower orthogonal coupling 260 need not have strictly orthogonal components but, instead, may have components that are affixed at less than orthogonal angles. The rotational motion of the upper orthogonal coupling 220 with reference to the lower orthogonal coupling 260 permits the bracket 202 to be tilted, thereby permitting tilt adjustment of the fishing rod.

The fishing rod holder 100 further comprises a base 298 that permits the fishing rod holder 100 to be mounted securely to a boat. The base 298 comprises a base socket that permits the lower adjustment shaft 280 to couple rotationally with the base 298. A lower wing nut 296 (or any other type of nut) engages the lower adjustment shaft 280, thereby permitting height adjustment of the lower adjustment shaft 280 by simply adjusting the position of the lower wing nut 296. This height adjustment using the lower wing nut 296, when combined with the height adjustment using the upper wing nut 206, provides greater flexibility than simply using only the upper wing nut 206 or only the lower wing nut 296.

Figure 3:
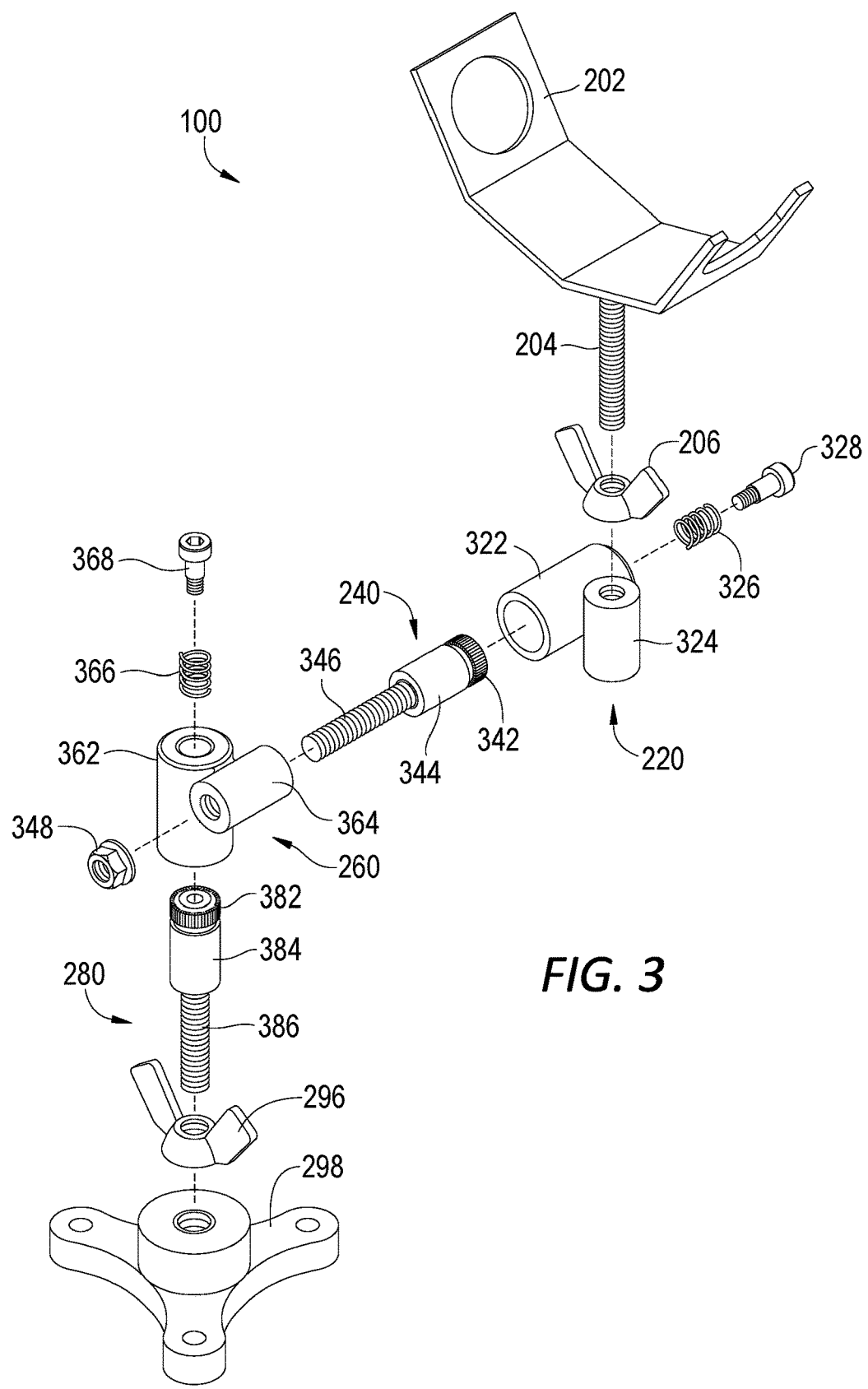
FIG. 3 is a drawing showing an exploded view of the embodiment of the fishing rod holder of FIG. 2.
Figure 4:
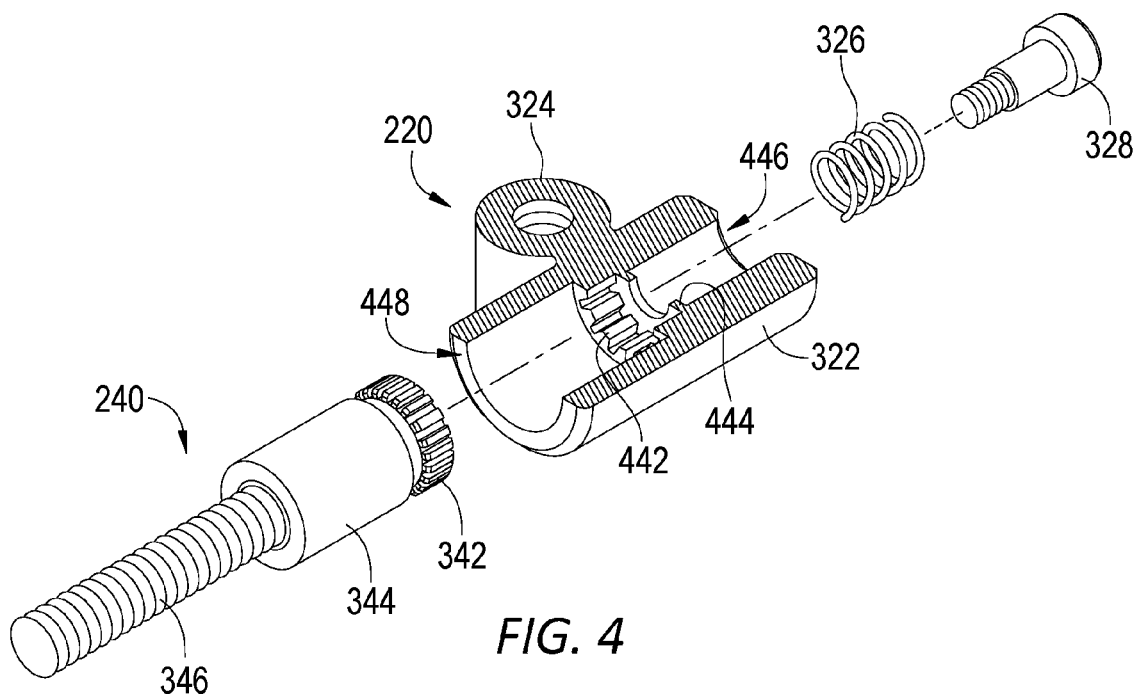
FIG. 4 is a drawing showing an exposed view of an embodiment of an orthogonal coupling.
Figure 5:
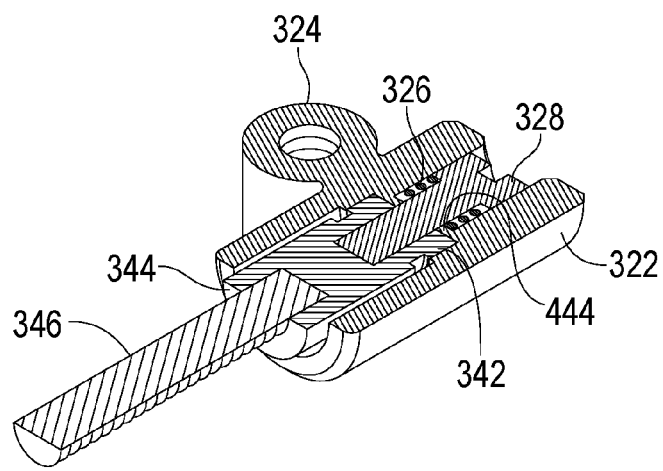
FIG. 5 is a drawing showing another exposed view of the embodiment of the orthogonal coupling of FIG. 4.

FIGS. 3, 4, and 5 are drawings showing different exploded views of the fishing rod holder 100 of FIG. 2. The exploded views of FIGS. 3, 4, and 5 explain in greater detail the operation of the fishing rod holder.

As shown in FIG. 3, the fishing rod holder 100 comprises the bracket 202 for holding the fishing rod, which has a threaded mounting rod 204 extending downward from the bracket 202. The fishing rod holder 100 comprises two orthogonal couplings, namely, an upper orthogonal coupling 220 and a lower orthogonal coupling 260.

The upper orthogonal coupling 220 comprises an upper socket 324. The threaded mounting rod 204 inserts into the upper socket 324 in such a way that the threaded mounting rod 204 and the upper socket 324 align axially, thereby permitting initial rotation of the bracket 202 with reference to the upper socket 324 before the bracket 202 is secured in place. The fishing rod holder 100 also comprises an upper wing nut 206 (or any other type of nut) that engages the threaded mounting rod 204. The upper wing nut 206 permits upward and downward adjustment of the bracket 202, essentially permitting height adjustments to the bracket 202 and the fishing rod (not shown) by simply turning the upper wing nut 206 clockwise or counterclockwise. The upper wing nut 206 can also be used in combination with another wing nut (not shown) to secure the threaded mounting rod 204 to the upper socket 324.

The upper orthogonal coupling 220 (shown in greater detail in FIGS. 4 and 5) also comprises an upper cylindrical housing 322 (although the outside shape does not necessarily need to be cylindrical). The upper cylindrical housing 322 comprises an upper spring housing 446 and an upper shaft housing 448, with an upper stop 444 (with a hole) separating the upper spring housing 446 from the upper shaft housing 448. The upper cylindrical housing 322 has an upper set of teeth 442 located in the inner wall 443 of the upper shaft housing 448, in relatively close proximity to the upper stop 444.

The fishing rod holder 100 further comprises an upper adjustment shaft 240. The upper adjustment shaft 240 comprises a substantially cylindrical upper shaft body 344, which comprises an upper spur gear 342 (or other type of gear or teeth) on the proximal end of the upper shaft body 344 and an upper threaded portion 346 on the distal end of the upper shaft body 344.

The fishing rod holder 100 further comprises an upper spring 326 and an upper socket head cap screw 328 (or bolt). The upper spring 326 inserts into the upper spring housing 446 until the upper spring 326 contacts the upper stop 444. The upper socket head cap screw 328 inserts into the coils of the upper spring 326, such that the head of the upper socket head cap screw 328 keeps the upper spring 326 in contact with the upper stop 444.

The proximal end of the upper adjustment shaft 240 is inserted into the upper shaft housing 448 so that the upper adjustment shaft 240 and the upper shaft housing 448 are axially aligned. Upon full insertion, the upper spur gear 342 engages with the upper set of teeth 442 within the upper shaft housing 448, thereby preventing axial rotation of the upper adjustment shaft 240 with reference to the upper cylindrical housing 322.

The upper socket head cap screw 328 mates securely with the proximal end (the end with the spur gear 342) of the upper adjustment shaft 240. Insofar as the upper spring 426 and the upper stop 444 reside between the securely-mated components (upper socket head cap screw 328 and upper adjustment shaft 240), the cooperative mechanical forces of the upper spring 326 and the upper stop 444 provide a spring-biased mechanism that permits the upper spur gear 342 to selectively engage or disengage from the upper set of teeth 442 by simply compressing the upper spring 326. Thus, when the upper spring 326 is compressed and the spur gear 342 disengages from the upper set of teeth 442, the upper adjustment shaft 240 can rotate axially with reference to the upper orthogonal coupling 220. Conversely, when the upper spring is not compressed and the spur gear 342 remains engaged with the upper set of teeth 442, the upper adjustment shaft 240 cannot rotate axially. As one can appreciate, this type of mechanism allows for angular adjustments without the need for additional tools. Because the bracket 202 is mechanically coupled to the upper orthogonal coupling 220, this angular adjustment allows the fishing rod (not shown) to be placed at different angles with reference to the surface of the water.

Those having skill in the art will understand that, although a coil spring 326 is shown, other similar mechanisms may be used instead of a spring 326. Furthermore, while a socket head cap screw 328 is shown for illustrative purposes, other types of bolts, screws, or mechanical fastening mechanisms may be used instead of a socket head cap screw 328.

The fishing rod holder 100 further comprises a lower orthogonal coupling 260. For this particular embodiment, the lower orthogonal coupling 260 is similar to the upper orthogonal coupling 220. As such, the lower orthogonal coupling 260 comprises a lower cylindrical housing 362 mated orthogonally with a lower socket 364. It should be appreciated that the two components of the lower orthogonal coupling 260 can be machined or fabricated from a single component. The lower cylindrical housing 362 comprises a lower spring housing (not labeled), a lower shaft housing (not labeled), a lower set of teeth (not labeled) in the lower shaft housing, a lower stop (not labeled), all of which are structurally similar or identical to their counterparts in the upper cylindrical housing 322. Insofar as these components are described with reference to the upper cylindrical housing 322, further discussion of these components is omitted here. The upper threaded portion 346 inserts axially into the lower socket 364 and is held in place by an upper hex nut 348 (or other securing mechanism).

The fishing rod holder 100 further comprises a lower adjustment shaft 280, which is similar to the upper adjustment shaft 240. As such, the lower adjustment shaft 280 comprises a substantially cylindrical lower shaft body 384 with a lower spur gear 382 on one end (arbitrarily denoted as the proximal end) and a lower threaded portion 386 on the other end (arbitrarily denoted as the distal end).

The proximal end of the lower adjustment shaft 280 is inserted axially into the lower cylindrical housing 362 such that the lower spur gear 382 selectively engages or disengages with the lower teeth (not labeled) within the lower cylindrical housing 362. The fishing rod holder 100 further comprises a lower spring 366 for insertion into the lower cylindrical housing 362. The lower spring 366 is kept in place by a lower socket head cap screw 368 that is secured to the proximal end (or gear end) of the lower adjustment shaft 280. Because the mechanical interaction between the lower adjustment shaft 280 and the lower cylindrical housing 362 is similar to the interaction between the upper adjustment shaft 240 and the upper cylindrical housing 322, only a truncated discussion of the relevant function is provided here.

In operation, the lower spring 366 permits selective engagement and disengagement of the lower spur gear 382 from the lower set of teeth (not shown), thereby permitting rotational movement of the lower orthogonal coupling 260 with reference to the lower adjustment shaft 280. Because the bracket 202 is indirectly coupled to the lower orthogonal coupling 260, this rotational movement permits the bracket 202 and, consequently, the fishing rod (not shown) to sweep through a plane that runs substantially parallel to the surface of the water. When the fishing rod (not shown) is in its desired position, the lower spur gear 382 is re-engaged to the lower set of teeth (not shown), thereby securing the fishing rod (not shown) at a desired sweep angle.

In order to adjust the position of the couplings, the user simply pulls the upper cylindrical housing 322 outwardly and away from the lower socket 364. This is done against the force of spring 326 and, in doing so disengages the teeth of gear 342 from the teeth 442 in the upper shaft housing 448. Upon disengagement, housing 322 can freely rotate to a desired position, whereupon the pulling force is released, permitting the teeth of gear 342 to reengage teeth 442, thereby securing the coupling in its newly adjusted position. The spring rate of spring 326 is low enough to enable compression of the spring, and thus, the disengagement of the associated gear teeth, using only one hand. Thus, the couplings are easily adjustable, requiring only a modicum of effort, and without the need for any tools.

Coupling 260 is adjusted in similar fashion, with the lower housing 362 being pulled upwardly, away from the base 298. This disengages the teeth of gear 382 from the lower set of teeth (not shown), contained within housing 362.

The fishing rod holder 100 further comprises a base 298 with a base socket (not labeled). The distal end of the lower adjustment shaft 280 (with the lower threaded portion 386) is axially inserted into the base socket (not labeled). A lower wing nut 296 secures engages the lower threaded portion 386, thereby permitting further height adjustments. Similar to how the bracket 202 is secured by the upper wing nut 206, the lower adjustment shaft 280 is secured to the base 298 using the wing nut 296, preferably in conjunction with another nut (not shown).

As shown in the embodiments of FIGS. 1 through 5, the fishing rod holder 100 permits ready adjustment of sweep angle, tilt angle, and height of a fishing rod 105 without the need for additional tools. In addition, the present design, owing to the relatively close spacing of the disclosed gear teeth in the couplings, permits a plurality of small or fine adjustments, as opposed to designs that are reliant on the use of tools to make adjustments. In one embodiment, rotational adjustment of the couplings can be made in increments as small as one degree, although various increments are contemplated and intended to fall within the scope of the present disclosure and claims.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A fishing rod holder, comprising:
a fishing rod bracket configured to hold a fishing rod;
a height-adjustable, mounting rod extending from the bracket;
an upper coupling assembly having an upper socket with an upper socket axis mated to an upper housing with a spring mounted therein,
said mounting rod being rotationally coupled to the upper socket,
the upper housing comprising an upper set of teeth;
the upper socket being mated with the upper cylindrical housing such that the upper housing axis is substantially orthogonal to the upper socket axis;
an upper shaft having an upper gear, the upper gear being inserted into the upper housing to selectively engage or disengage the upper set of teeth with an engagement being maintained under force from said spring;
a lower coupling assembly having a lower socket with a lower socket axis mated to a lower housing, the lower housing having a lower set of teeth;
a height-adjustable lower shaft having a lower gear the lower gear being inserted into the lower housing to selectively engage or disengage the lower set of teeth;
said lower shaft being rotationally coupled to the lower socket such that the lower shaft is substantially orthogonal to the lower socket axis;
and
a base for mounting the holder to a support surface.

2. A fishing rod holder, comprising:
a lower orthogonal coupling, including
a lower cylindrical housing, with:
a lower spring housing;
a lower shaft housing;
a lower set of teeth located in the lower shaft housing;
a lower stop located between the lower spring housing and the lower shaft housing;
a lower housing axis;
a lower socket comprising a lower socket axis, the lower socket being mated with the lower cylindrical housing such that the lower housing axis is substantially orthogonal to the lower socket axis;
an upper adjustment shaft, with
a substantially cylindrical upper shaft body;
an upper shaft axis;
an upper shaft distal end;
an upper shaft proximal end;
an upper shaft threaded portion located toward the upper shaft distal end, the upper shaft threaded portion to insert into the lower socket such that the upper shaft axis substantially aligns with the lower socket axis;
an upper spur gear located toward the upper shaft proximal end;
an upper orthogonal coupling, including
an upper cylindrical housing, with
an upper spring housing;
an upper shaft housing to receive the upper shaft proximal end;
an upper set of teeth located in the upper shaft housing, the upper set of teeth to engage the upper spur gear to prevent rotation of the upper spur gear around the upper shaft axis when the upper spur gear engages the upper set of teeth;
an upper stop located between the upper spring housing and the upper shaft housing;
an upper housing axis substantially aligned with the upper shaft axis when the upper shaft housing receives the upper shaft proximal end; and
an upper socket comprising an upper socket axis, the upper socket being mated with the upper cylindrical housing such that the upper housing axis is substantially orthogonal to the upper socket axis.

3. The system of claim 2, further comprising:
a bracket for holding a fishing rod;
a threaded mounting rod extending from the bracket, the threaded mounting rod to insert into the upper socket, the threaded mounting rod comprising a mounting rod axis that substantially aligns with the upper socket axis when the threaded mounting rod is inserted into the upper socket, the alignment of the upper socket axis and the mounting rod axis permitting initial rotation of the bracket around the mounting rod axis; and an upper wing nut for engaging the threaded mounting rod, the engagement of the upper wing nut with the threaded mounting rod permitting adjustment of a height of the bracket.

4. The system of claim 2, further comprising:

an upper spring for insertion into the upper spring housing, the upper spring contacting the upper stop when inserted into the upper spring housing, the upper spring comprising an upper coil; and an upper socket head cap screw having an upper head cap, the upper socket head cap screw for insertion into the upper coil, the upper spring contacting the upper head cap when the upper socket head cap screw is inserted into the upper coil, the upper socket head cap screw for securely mating with the upper shaft proximal end.

5. The system of claim 2, further comprising:

an upper hex nut for mating with the upper shaft threaded portion.

6. The system of claim 2, further comprising:

a lower adjustment shaft, comprising:

a substantially cylindrical lower shaft body, comprising:

a lower shaft axis;

a lower shaft distal end;

a lower shaft proximal end for inserting into the lower housing, the lower shaft axis substantially aligning with the lower housing axis when the lower shaft proximal end is inserted into the lower housing;

a lower shaft threaded portion located toward the lower shaft distal end;

a lower spur gear located toward the lower shaft proximal end, the lower spur gear to engage the lower set of teeth to prevent rotation of the lower spur gear around the lower shaft axis when the lower spur gear engages the lower set of teeth.

7. The system of claim 6, further comprising:

a lower spring for insertion into the lower spring housing, the lower spring contacting the lower stop when inserted into the lower spring housing, the lower spring comprising a lower coil; and a lower socket head cap screw having a lower head cap, the lower socket head cap screw for insertion into the lower coil, the lower spring contacting the lower head cap when the lower socket head cap screw is inserted into the lower coil, the lower socket head cap screw for securely mating with the lower shaft proximal end.

8. The system of claim 6, further comprising:

a base, comprising:

a base socket for insertion of the lower shaft threaded portion;

a base socket axis that is substantially aligned with the lower shaft axis when the lower shaft threaded portion is inserted into the base socket, the alignment of the base socket axis and the lower shaft axis permitting rotation of the lower shaft around the base socket axis; and a lower wing nut for engaging the lower shaft threaded portion, the engagement of the upper wing nut with the lower shaft threaded portion permitting adjustment of a height of the lower orthogonal coupling.

* * * * *